(12) United States Patent
Tambe et al.

(10) Patent No.: US 12,462,670 B2
(45) Date of Patent: Nov. 4, 2025

(54) LONG DURATION ALARM SEQUENCE PREDICTIONS USING BI-LSTM AND OPERATOR SEQUENCE RECOMMENDATIONS THEREOF

(71) Applicant: Tata Consultancy Services Limited, Mumbai (IN)

(72) Inventors: Yogesh Angad Tambe, Pune (IN); Trinath Gaduparthi, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 156 days.

(21) Appl. No.: 18/586,270

(22) Filed: Feb. 23, 2024

(65) Prior Publication Data
US 2024/0428678 A1    Dec. 26, 2024

(30) Foreign Application Priority Data
Jun. 23, 2023   (IN) .............................. 202321042213

(51) Int. Cl.
| G08B 31/00 | (2006.01) |
| G06N 3/0442 | (2023.01) |
| G08B 29/18 | (2006.01) |

(52) U.S. Cl.
CPC ........... *G08B 31/00* (2013.01); *G06N 3/0442* (2023.01); *G08B 29/186* (2013.01)

(58) Field of Classification Search
CPC .... G08B 31/00; G08B 29/186; G06N 3/0442; G06N 3/044; G06N 3/045; G06N 3/08;
(Continued)

(56) References Cited

U.S. PATENT DOCUMENTS

| 2017/0061783 A1* | 3/2017 | Nalukurthy .......... G08B 29/186 |
| 2022/0407882 A1* | 12/2022 | Neuvirth ............. H04L 63/1433 |
| 2023/0015468 A1* | 1/2023 | Brhmadesam ......... G06N 20/00 |

OTHER PUBLICATIONS

Villalobos, Kevin et al., "A flexible alarm prediction system for smart manufacturing scenarios following a forecaster—analyzer approach", Title of the item: Journal of Intelligent Manufacturing, Date: 2021, Link: https://www.researchgate.net/publication/343058727_A_flexible_alarm_prediction_system_for_smarl_manufacturing_scenarios_following_a_forecaster-analyzer_approach.
(Continued)

*Primary Examiner* — An T Nguyen
(74) *Attorney, Agent, or Firm* — Finnegan, Henderson, Farabow, Garrett & Dunner, LLP

(57) ABSTRACT

Techniques used by the state of the art alarm prediction systems rely mostly on LSTM, which have technical limitation in predicting a sequence with long durations. Embodiments of the present disclosure provide a method and system for long duration alarm sequence predictions from past alarm sequence using a Bi-LSTM and operator sequence recommendations thereof. The BiLSTM with an encoder decoder technique uses true output sequence as input to decoder at each time step during training. This allows the BiLSTM to learn dependencies among input and output sequence effectively. The operator sequence recommended is identified based on closeness of the predicted future output alarm sequence with one among the unique alarm sequences in a mapping table. The alarm sequence closeness is computed using a Matching Sequence Score (MSS) disclosed by the method, since known sequence evaluation metrics such as Blue Score has limitations to be directly applied in alarm sequence evaluation.

12 Claims, 7 Drawing Sheets

(58) Field of Classification Search
CPC .............. G05B 23/0283; G05B 23/024; G05B 23/0221
See application file for complete search history.

(56) References Cited

OTHER PUBLICATIONS

Walker, Connor et al., "A Deep Learning Framework for Wind Turbine Repair Action Prediction Using Alarm", Sequences and Long Short Term Memory Algorithms. Date: 2022, Link: https:arxiv.org/pdf/2207.09457.pdf.
Abonyi, János et al., "Event-Tree Based Sequence Mining Using LSTM Deep-Learning Model", Title of the item: Complexity, Date: 2021, Publisher: Hindawi Link: https://www.hindawi.com/journals/complexity/2021/7887159/.
Dorgoa, Gyula et al., "Learning operation strategies from alarm management systems by temporal pattern mining and deep learning", Title of the item: 28th European Symposium on Computer Aided Process Engineering, Date: 2018, Link: https://www.researchgate.net/publication/325930409_Learning_operation_strategies_from_alarm_management_systems_by_temporal_pattern_mining_and_deep_learning.
Korsbakke, Andreas et al., "Forecasting alarms using machine learning", Title of the item: Thesis, Date: 2021, Publisher: Blekinge Institute of Technology Link: https://www.diva-portal.org/smash/get/diva2:1577240/FULLTEXT02.

\* cited by examiner

Predict Next Alarm

Predict Few Important Alarms

Number of LSTM units (n_units) = 128

Number of epochs (epochs)= 30

Batch size (batch_size) = 128

$relu\ activation\ fun(x) = \max(0, x)$

Dropout (dropout)= 0.3

$weighted\ focal\ loss\ (y_{pred}, \alpha, \gamma) = -\alpha(1 - y_{pred})^{\gamma} \log(y_{pred})$ Optimizer = 'rmsprop'

LONG DURATION ALARM SEQUENCE PREDICTIONS USING BI-LSTM AND OPERATOR SEQUENCE RECOMMENDATIONS THEREOF

PRIORITY CLAIM

This U.S. patent application claims priority under 35 U.S.C. § 119 to: Indian Patent Application No. 202321042213, filed on 23 Jun. 2023. The entire contents of the aforementioned application are incorporated herein by reference.

TECHNICAL FIELD

The embodiments herein generally relate to the field of automated alarm-based systems. and, more particularly, to a method and system for long duration alarm sequence predictions from past alarm sequence using Bidirectional Long short-term memory (Bi-LSTM) and operator sequence recommendations thereof.

BACKGROUND

An alarm management system is an integral part of a manufacturing or process plant. Faults in a plant or inefficient processes can be identified using alarms. These alarms can be triggered due to deviations of process parameters from their operating or safe ranges. Once the operator takes relevant actions to mitigate the fault or bring the process back into a desired state in response to triggered alarms, the alarms may go into an inactive state. If the future alarms sequence is known in advance, then the operator will be better prepared to take corrective actions. Further, prediction of a future sequence of alarms helps the operator know the propagation of deviations in a plant. Hence, prediction of future alarms sequence can help the operator to mitigate the faults and to operate the plant efficiently. Alarm forecasting or prediction problems in the art are limited to predicting the next alarm using past alarm sequence. Efforts are also made towards predicting of some frequent and rare alarms using past sequence, which is multilabel classification problem. However, this approach does not address predicting entire alarm sequence. Hardly any attempts are observed that focus on predicting alarm sequences. Having knowledge of the next alarm or a few important alarms is not sufficient to ensure equipment or machines in a facility have minimal failures or minimal downtime for maintenance. Knowing an entire alarm sequence helps to take proactive measurements and can reduce failures and maintenance downtimes drastically, effectively enabling functional continuity of a facility.

The sequence-to-sequence prediction task was tried out in literature in the last decade for problems in specific domains like language translation. The Long short-term memory (LSTM) has been recently applied for next alarms predictions, however, LSTM based approaches have limitations in accurate sequence predictions as the LSTM architecture uses only past information while training the model.

Further, the duration or time window of alarm prediction provided by the existing methods is comparatively very small in range minutes. It can be well understood that smaller the forecasting window, more is the challenge in responding with the best preventive measure. This is due to technical limitation of LSTM to learn dependencies among input and output sequence effectively to provide longer duration predictions. Thus, addressing technical challenges to enable longer prediction windows is desired for better action or response planning by operators.

SUMMARY

Embodiments of the present disclosure present technological improvements as solutions to one or more of the above-mentioned technical problems recognized by the inventors in conventional systems.

For example, in one embodiment, a method for long duration alarm sequence predictions from past alarm sequence is provided. The method includes generating an alarm dataset for a facility from historical alarm data comprising a timestamp of a triggered alarm, alarm identity (ID), alarm description and related equipment in the facility, wherein the facility is monitored via a plurality of sensors to capture the historical alarm data, each datapoint in the alarm dataset comprising a past input alarm sequence and a future output alarm sequence comprising single or multiple occurrences of unique alarms each identified with the alarm ID.

Further, the method includes preprocessing the alarm dataset to generate a training dataset, wherein the preprocessing comprising chattering removal, unimportant alarms removal, resizing the past input alarm sequence to an optimal input sequence length and the future output alarm sequence to an optimal output sequence length.

Further, the method includes training a Bidirectional Long short-term memory (BiLSTM) on a training dataset for predicting an alarm sequence for the facility for a time duration of a plurality of hours, wherein a total number of the unique alarms in the historical alarm data represent a plurality of features for the BiLSTM, the optimal input sequence length is an input to the Bi-LSTM to generate the optimal output sequence length of the future output alarm sequence to be predicted post training by the BiLSTM.

Furthermore, the method includes generating a mapping table using the preprocessed historical alarm data of the facility to map a plurality of unique alarm sequences with associated plurality of operator action sequences.

Further, the method includes predicting by the trained BiLSTM executed by the one or more hardware processor, a future output alarm sequence for a next plurality of hours based on an immediate input alarm sequence recorded in recent past for the facility.

Furthermore, the method includes recommending an operator action sequence from among the plurality of operator action sequences for the predicted future alarm output sequence, wherein the recommended operator action sequence is associated with a unique alarm sequence from among the plurality of unique alarm sequences that has a highest Matching Sequence Score (MSS) with the predicted future output alarm sequence.

In another aspect, a system for long duration alarm sequence predictions from past alarm sequence is provided. The system comprises a memory storing instructions; one or more Input/Output (I/O) interfaces; and one or more hardware processors coupled to the memory via the one or more I/O interfaces, wherein the one or more hardware processors are configured by the instructions to generate an alarm dataset for a facility from historical alarm data comprising a timestamp of a triggered alarm, alarm identity (ID), alarm description and related equipment in the facility, wherein the facility is monitored via a plurality of sensors to capture the historical alarm data, each datapoint in the alarm dataset comprising a past input alarm sequence and a future output alarm sequence comprising single or multiple occurrences of unique alarms each identified with the alarm ID.

Further, the one or more hardware processors preprocess processes the alarm dataset to generate a training dataset, wherein the preprocessing comprising chattering removal, unimportant alarms removal, resizing the past input alarm sequence to an optimal input sequence length and the future output alarm sequence to an optimal output sequence length.

Further, the one or more hardware processors train a Bidirectional Long short-term memory (BiLSTM) on a training dataset for predicting an alarm sequence for the facility for a time duration of a plurality of hours, wherein a total number of the unique alarms in the historical alarm data represent a plurality of features for the BiLSTM, the optimal input sequence length is an input to the Bi-LSTM to generate the optimal output sequence length of the future output alarm sequence to be predicted post training by the BiLSTM.

Furthermore, the one or more hardware processors generate a mapping table using the preprocessed historical alarm data of the facility to map a plurality of unique alarm sequences with associated plurality of operator action sequences.

Further, the one or more hardware processors predict by the trained BiLSTM executed by the one or more hardware processor, a future output alarm sequence for a next plurality of hours based on an immediate input alarm sequence recorded in recent past for the facility.

Furthermore, the one or more hardware processors recommend an operator action sequence from among the plurality of operator action sequences for the predicted future alarm output sequence, wherein the recommended operator action sequence is associated with a unique alarm sequence from among the plurality of unique alarm sequences that has a highest Matching Sequence Score (MSS) with the predicted future output alarm sequence.

In yet another aspect, there are provided one or more non-transitory machine-readable information storage mediums comprising one or more instructions, which when executed by one or more hardware processors causes a method for long duration alarm sequence predictions from past alarm sequence.

The method includes generating an alarm dataset for a facility from historical alarm data comprising a timestamp of a triggered alarm, alarm identity (ID), alarm description and related equipment in the facility, wherein the facility is monitored via a plurality of sensors to capture the historical alarm data, each datapoint in the alarm dataset comprising a past input alarm sequence and a future output alarm sequence comprising single or multiple occurrences of unique alarms each identified with the alarm ID.

Further, the method includes preprocessing the alarm dataset to generate a training dataset, wherein the preprocessing comprising chattering removal, unimportant alarms removal, resizing the past input alarm sequence to an optimal input sequence length and the future output alarm sequence to an optimal output sequence length.

Further, the method includes training a Bidirectional Long short-term memory (BiLSTM) on a training dataset for predicting an alarm sequence for the facility for a time duration of a plurality of hours, wherein a total number of the unique alarms in the historical alarm data represent a plurality of features for the BiLSTM, the optimal input sequence length is an input to the Bi-LSTM to generate the optimal output sequence length of the future output alarm sequence to be predicted post training by the BiLSTM.

Furthermore, the method includes generating a mapping table using the preprocessed historical alarm data of the facility to map a plurality of unique alarm sequences with associated plurality of operator action sequences.

Further, the method includes predicting by the trained BiLSTM executed by the one or more hardware processor, a future output alarm sequence for a next plurality of hours based on an immediate input alarm sequence recorded in recent past for the facility.

Furthermore, the method includes recommending an operator action sequence from among the plurality of operator action sequences for the predicted future alarm output sequence, wherein the recommended operator action sequence is associated with a unique alarm sequence from among the plurality of unique alarm sequences that has a highest Matching Sequence Score (MSS) with the predicted future output alarm sequence. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
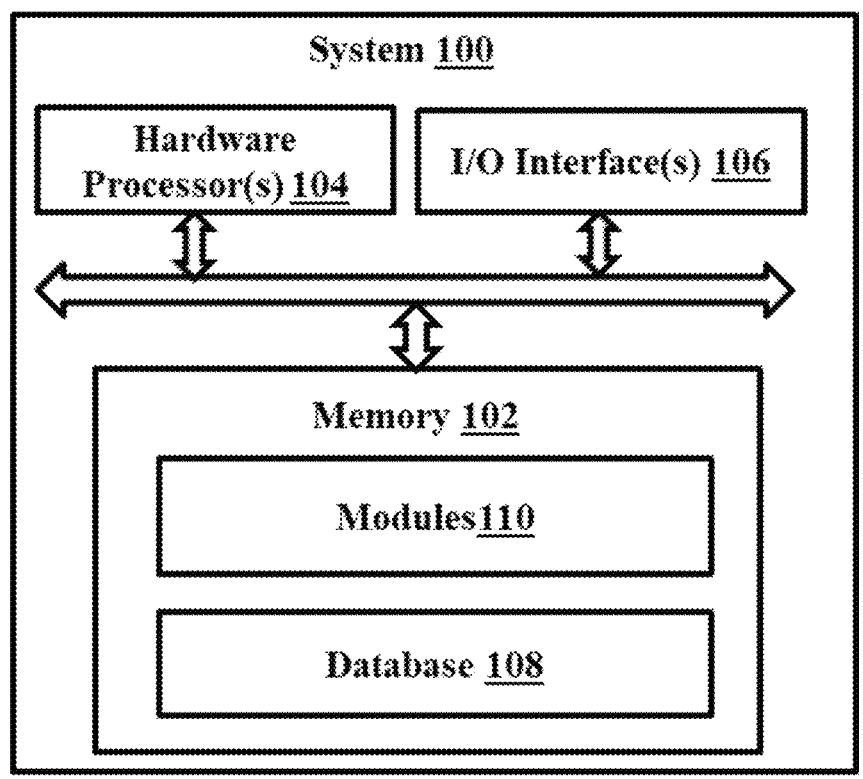
FIG. 1A is a functional block diagram of a system for long duration alarm sequence predictions from past alarm sequence using a Bidirectional Long short-term memory (Bi-LSTM) neural network (NN) and operator sequence recommendations thereof, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Techniques used by the state of the art alarm prediction systems rely mostly on Long short-term memory (LSTM). Conventional methods predict single or few important alarms. One of the works in literature "*Learning operation strategies from alarm management systems by temporal pattern mining and deep learning*: by Dorgo et. al., attempts predicting alarm sequence, however it again relies on the LSTM architecture. LSTM architecture uses only past information while training the model hence accuracy of predictions is comparatively lower. Furthermore, unlike Bidirectional LSTM, LSTM does not learn dependencies among input and output sequence effectively and hence cannot predict alarm sequences with longer duration. The benchmark dataset used by the above mentioned work is a simulated dataset and not complex, unlike real world dataset. The number of faults introduced to generate alarm events is 11 and the examples of alarm sequence have largest sequence length as 5 which is very small.

This improves learning of the algorithm and predicts alarm sequence more accurately. The benchmark dataset from the used in the above mentioned work in literature is simulated dataset and which is not complex. The number of faults introduced to generate alarm events is 11. The examples of alarm sequence shown in the paper have largest sequence length as 5 which is very small.

Embodiments of the present disclosure provide a method and system for long duration alarm sequence predictions from past alarm sequence using a Bidirectional Long short-term memory (Bi-LSTM) neural network (NN) and operator sequence recommendations thereof. The BiLSTM with an encoder decoder technique uses true output sequence as input to decoder at each time step during training. This allows the BiLSTM to learn dependencies among input and output sequence effectively and can predict longer sequence. The system disclosed herein can predict future output alarm sequence for time duration of couple of hours, for example, 480 mins in future.

Further, the system and method disclosed provides a mapping table with each unique alarm sequences mapped to associated operator action sequence. The predicted future output sequence is evaluated against each of the unique alarm sequences to identify the closest unique alarm sequence using a Matching Sequence Score (MSS) disclosed by the method. Known sequence evaluation metrics such as Bilingual Evaluation Understudy (BLUE) score, edit distance score that are used in language translation models cannot be applied to alarm sequence evaluation. The BLUE score and edit distance score are used in the field of language translation where the words and phrases follow a certain pattern. These scores are based on N-gram modules, which are very specific to the language translation task. The same does not help to evaluate in the field of alarm sequence prediction. One of the work in the art suggests an evaluation metrics for alarm sequence prediction, however, considers only longest sequence. The longest sequence does not perform well in case there is single incorrect alarm predicted between two long sequence.

The MSS disclosed by the method enables comparison between two alarm sequences, which enables to map predicted alarm sequence to closest prior defined alarm sequence and associated well tested operator actions defined in the mapping table. Thus, ensures taking most appropriate actions for any alarm sequence predicted by the system 100.

An operator sequence in the mapping table that corresponds to the closest the best alarm sequence is recommended to an operator to ensure best possible preventive or precautionary measures are executed to avoid malfunctioning or failures of one or more equipment in a facility under observation.

Referring now to the drawings, and more particularly to FIGS. 1A through 5, where similar reference characters denote corresponding features consistently throughout the figures, there are shown preferred embodiments and these embodiments are described in the context of the following exemplary system and/or method.

FIG. 1A is a functional block diagram of a system 100, for long duration alarm sequence predictions from past alarm sequence using a Bidirectional Long short-term memory (Bi-LSTM) neural network (NN) and operator sequence recommendations thereof, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

Figure 1B:
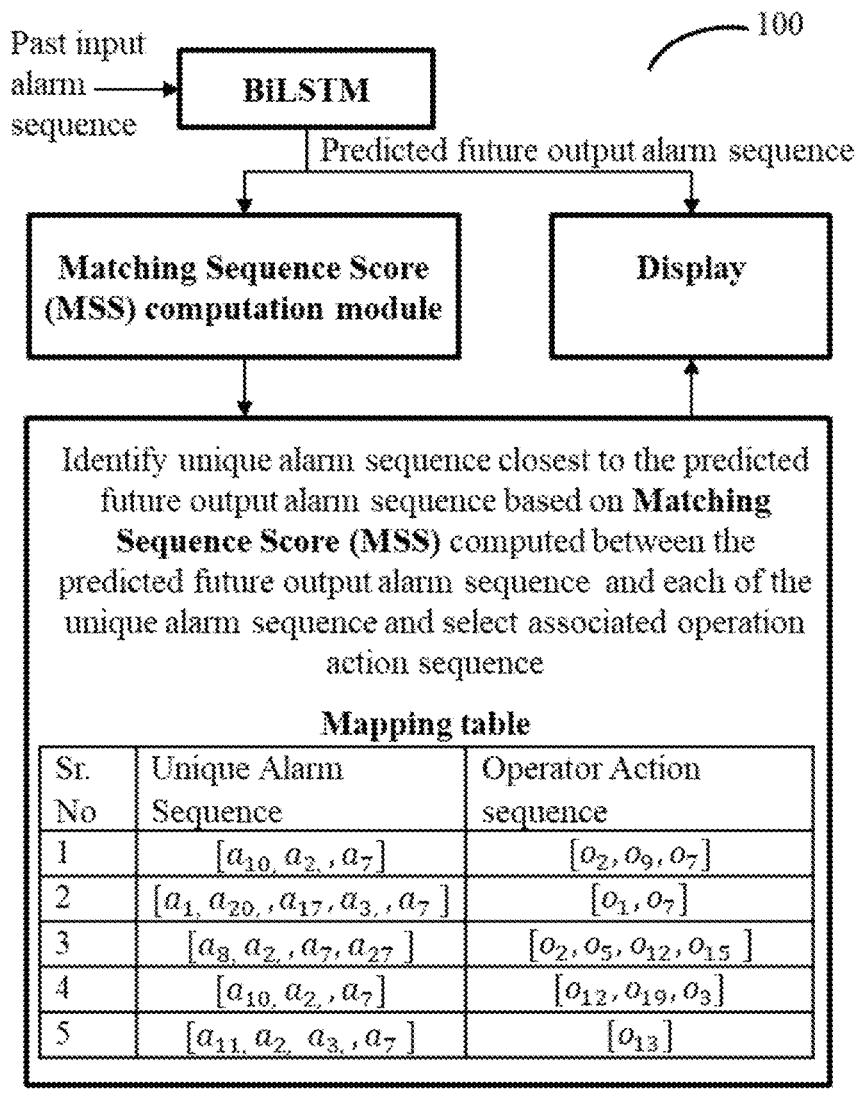
FIG. 1B illustrates an architectural and process overview of the system of FIG. 1A, in accordance with some embodiments of the present disclosure.

The I/O interface(s) 106 can include a variety of software and hardware interfaces, for example, a web interface, a graphical user interface such as a display as depicted in system architecture and process overview of FIG. 1B, and the like, The I?O interface 106 can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110. For example, the BiLSTM with the encoder and the decoder, as depicted in FIG. 1B and explained in conjunction with FIG. 5, a MSS computation module to compute MSS for evaluation alarm sequences, and models such as preprocessing module (not shown) and the like. The plurality of modules 110 include programs or coded instructions that supplement applications or functions performed by the system 100 for executing different steps involved in the process of alarm sequence predictions from past alarm sequence using and operator sequence recommendations, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure.

Further, the memory 102 includes a database 108. The database can store historical alarm data comprising a timestamp of a triggered alarm, alarm identity (ID), alarm description and related equipment in the facility, preprocessed data generated from the historical alarm data by the preprocessing module, a training dataset, a validation dataset, and a test dataset generated from the preprocessed data for training, validation, and testing of the BiLSTM. The database (or repository) 108 may include a plurality of abstracted pieces of code for refinement and data that is processed, received, or generated as a result of the execution of the plurality of modules in the module(s) 110.

Although the database 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to FIG. 1B through FIG. 5.

Figure 2A:
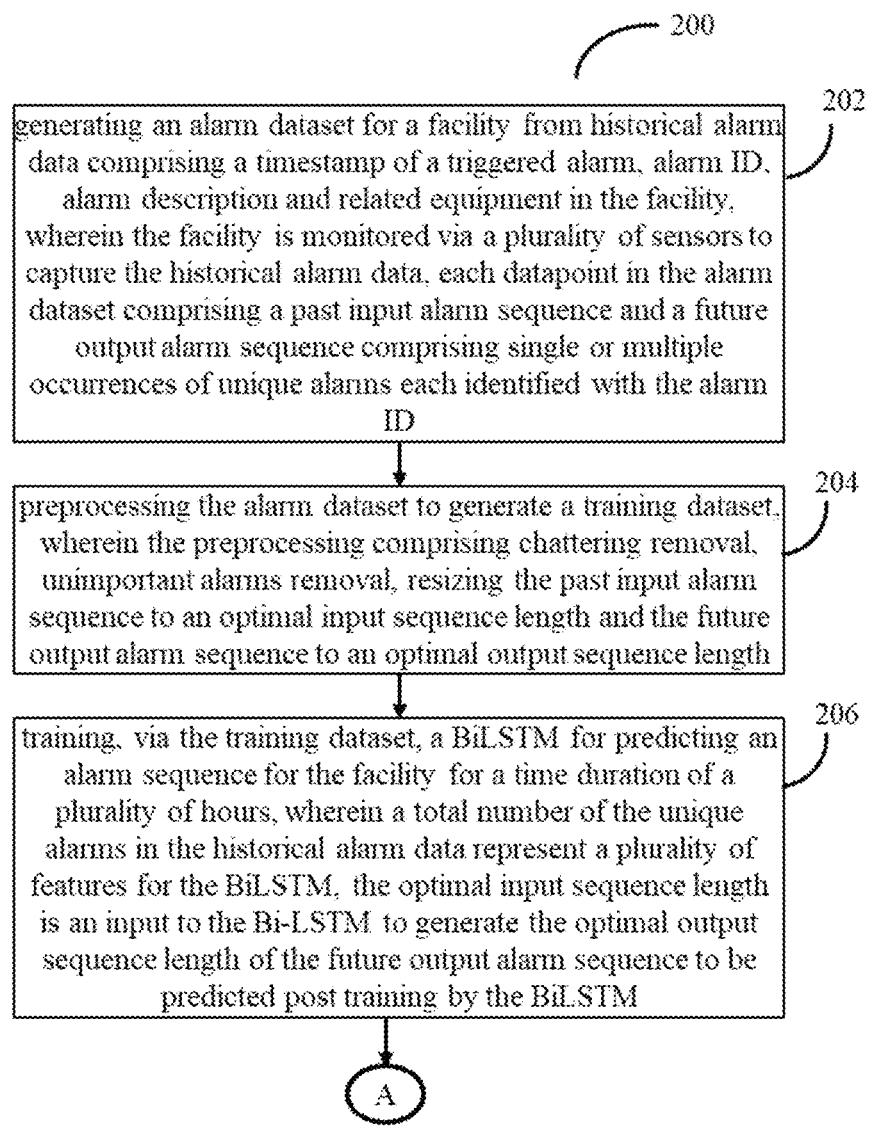
FIGS. 2A through 2B (collectively referred as FIG. 2) is a flow diagram illustrating a method for long duration alarm sequence predictions from past alarm sequence and operator sequence recommendations thereof, using the system depicted in FIGS. 1A and 1B, in accordance with some embodiments of the present disclosure.
Figure 2B:
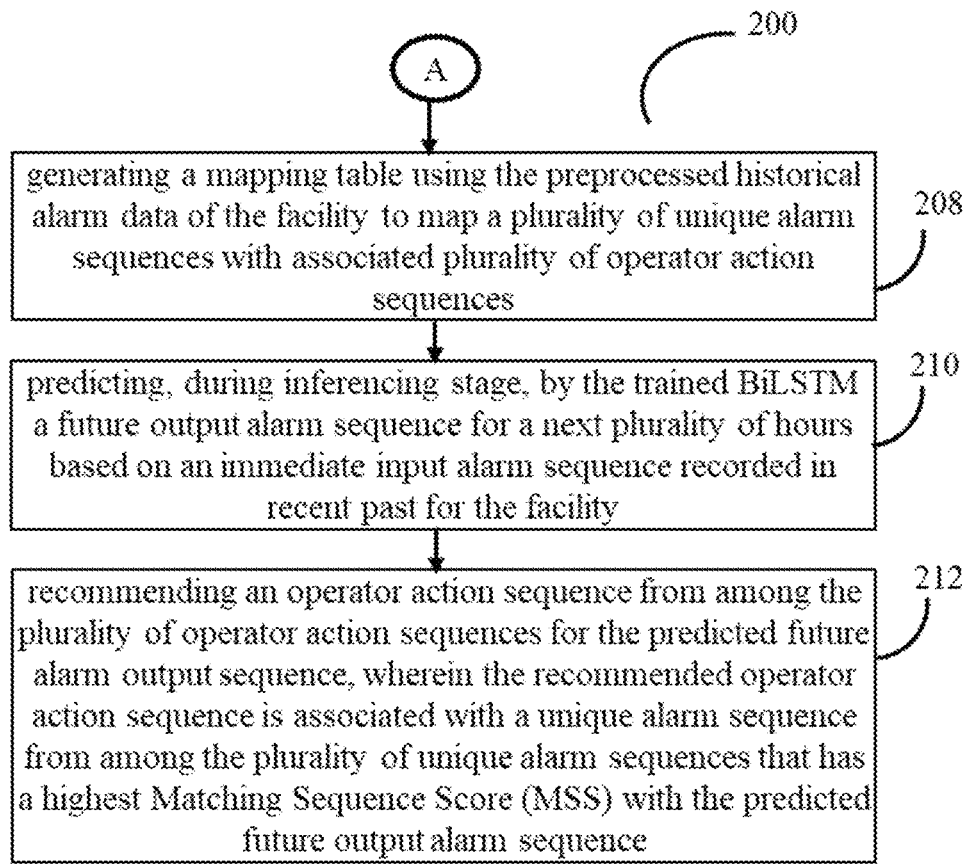

FIGS. 2A through 2B (collectively referred as FIG. 2) is a flow diagram illustrating a method 200 for long duration alarm sequence predictions from past alarm sequence and operator sequence recommendations thereof, using the system depicted in FIGS. 1A and 1B, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to the steps of the method 200, at step 202 of the method 200, the one or more hardware processors 104 are configured to generate an alarm dataset for a facility from the historical alarm data. The historical alarm data comprises a time series dataset of triggered alarms, corresponding timestamp, alarm identity (ID), alarm description and related equipment in the facility. The facility comprises a plurality of equipment and is monitored via a plurality of sensors to capture the historical alarm data. The snippet of the historical alarm data is shown in Table 1 below:

TABLE 1

| Timestamp | Alarm ID | Equipment No |
|---|---|---|
| 03-03-2019 18:17 | 139 | 4 |
| 03-03-2019 18:17 | 139 | 4 |
| 03-03-2019 18:52 | 111 | 4 |
| 03-03-2019 18:52 | 111 | 4 |
| 03-03-2019 19:08 | 138 | 4 |
| 03-03-2019 19:08 | 138 | 4 |
| 03-03-2019 20:42 | 29 | 4 |
| 03-03-2019 20:42 | 29 | 4 |
| 03-03-2019 20:42 | 29 | 4 |
| 04-03-2019 16:44 | 12 | 4 |

Each datapoint in the alarm dataset comprises a past input alarm sequence and a future output alarm sequence comprising single or multiple occurrences of unique alarms each identified with the alarm ID. Snippet of Input and output alarm sequence dataset is shown in Table 2 below:

TABLE 2

| Input Sequence | Output Sequence |
|---|---|
| 98, 28, 98, 26, 138, 98, 28, 98, 11, 45, 98, 31, 98 | 98, 11, 98, 11, 98, 11, 26, 11, 26, 11, 98, 26, 11, 98 |
| 98, 26, 98, 26, 98, 26, 98 | 98, 98, 98, 98, 98, 98 |
| 11, 98, 11, 98, 11, 26, 98, 11, 98, 26, 11, 45, 98 | 98, 11, 98, 45 |
| 26, 31, 26, 11, 98, 11, 98, 11, 98, 45, 11, 98 | 98, 30, 98, 1, 98, 47, 11, 98 |
| 11, 98, 11, 98, 11, 26, 98, 11, 98, 26, 11, 45, 98 | 98, 11, 98, 45, 11, 45, 46, 98 |

At step 204 of the method 200, the one or more hardware processors 104 are configured to preprocess the alarm dataset to generate a training dataset. Similarly, validation and testing datasets are generated for the BiLSTM. The preprocessing comprises chattering removal, unimportant alarms removal, resizing the past input alarm sequence to an optimal input sequence length and the future output alarm sequence to an optimal output sequence length with padding and truncating as needed. The optimal length for the input sequence and output sequence is identified. The optimal sequence length is a sequence length at which only 5% of the data points have sequence length greater than the optimal sequence length. The snippet of training data after preprocessing is shown in Table 3 below. Processed validation and testing data will look similar.

TABLE 3

| Input Sequence | Output Sequence |
|---|---|
| 98, 28, 98, 26, 138, 98, 28, 98, 11, 45, 98, 31 | 98, 11, 98, 11, 98, 11, 26, 11, 26, 11, 98, 26 |

TABLE 3-continued

| Input Sequence | Output Sequence |
| --- | --- |
| 11, 98, 11, 98, 11, 26, 98, 11, 98, 26, 11, 45 26, 31, 26, 11, 98, 11, 98, 11, 98, 45, 11, 98 | 98, 11, 98, 45, 0, 0, 0, 0, 0, 0, 0, 0 98, 30, 98, 1, 98, 47, 11, 98, 0, 0, 0, 0 |

Figure 5:
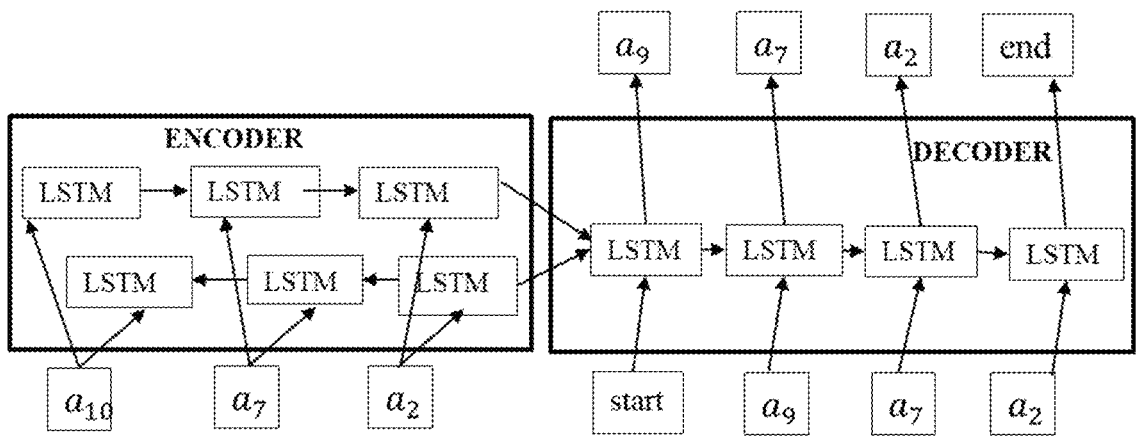
FIG. 5 illustrates an architecture of the Bi-LSTM with encoder and decoder for predicting future output alarm sequence, in accordance with some embodiments of the present disclosure.

At step 206 of the method 200, the one or more hardware processors 104 are configured to train, using the training dataset, the BiLSTM for predicting an alarm sequence for the facility for a time duration of a plurality of hours. A total number of the unique alarms in the historical alarm data represent a plurality of features for the BiLSTM, the optimal input sequence length is an input to the Bi-LSTM to generate the optimal output sequence length of the future output alarm sequence to be predicted post training by the BiLSTM. For example, the number of unique alarms in the dataset (n_features)=155, and past input sequence length (n_inputs)=109, future output sequence length (n_outputs) =20. As depicted in FIG. 5, the BiLSTM with encoder decoder architecture is used for sequence-to-sequence prediction tasks. An example of sequence-to-sequence translation is language translation in the field of natural language processing. The past input alarm sequence $[a_{10}, a_7, a_2, a_5]$ is used to predict future alarm output sequence $[a_9, a_7, a_2, a_{10}]$. The training and testing of encoder is the same. Training of decoder takes true output as input to predict next alarm. Testing using decoder takes whole sequence as input to predict future sequence length.

The list of optimized hyper tuned parameters is listed below and determined experimentally to give the best performance of BiLSTM when applied for alarm sequence prediction.
 i. Number of LSTM units (n_units)=128
 ii. Number of epochs (epochs)=30
 iii. Batch size (batch_size)=128
 iv. Activation function (activation)=relu activation fun(x) =max(0, x). The activation function and loss function used herein is well known in the ML domain and not explained for brevity). The variables for the activation function are in the form of inputs to neuron (w+b*x), b=bias and w=weight, as well known in the art
 v. Dropout (dropout)=0.3
 vi. Loss function (loss)=weighted focal loss($y_{pred}$, α, γ)=−α$(1-y_{pred})^\gamma$ log($y_{pred}$), wherein, α=weighing factor, γ=focusing factor
 vii. Optimizer='rmsprop'

At step 208 of the method 200, the one or more hardware processors 104 are configured to generating a mapping table using the preprocessed historical alarm data of the facility to map a plurality of unique alarm sequences with associated plurality of operator action sequences. The database of alarm sequence and corresponding operator actions is prepared from past knowledge and stored in the database 108. The snippet of the database is shown in the mapping table of FIG. 1B. The predicted alarm sequence is compared with the alarm sequences from the database using match sequence length algorithm. The algorithm finds the closest matching alarm sequence to predicted alarm sequence and corresponding operator action is suggested from the database.

Figure 3A:
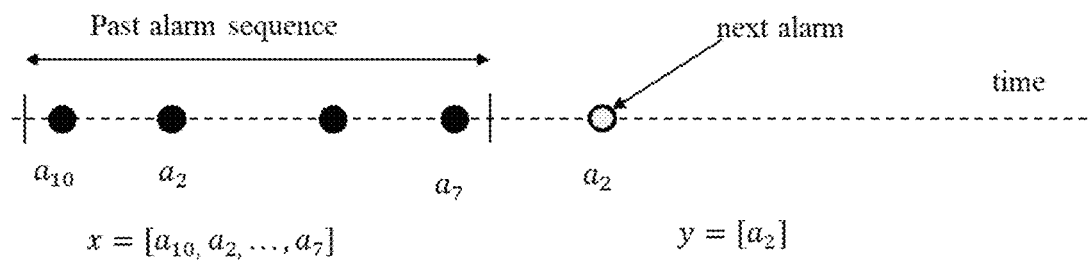
FIGS. 3A and 3B illustrate alarm predictions as generated by prior arts.
Figure 3B:
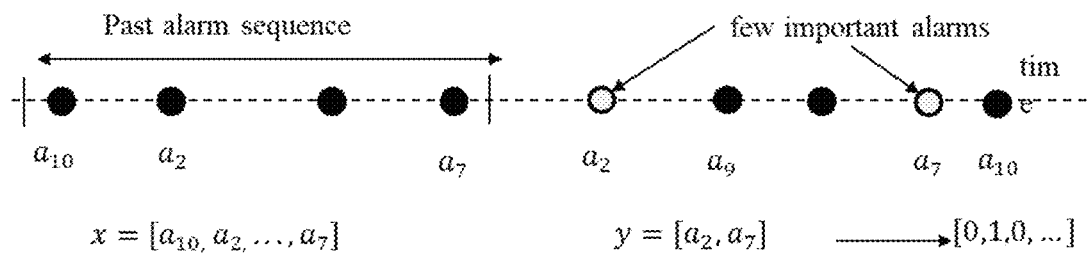
Figure 4:
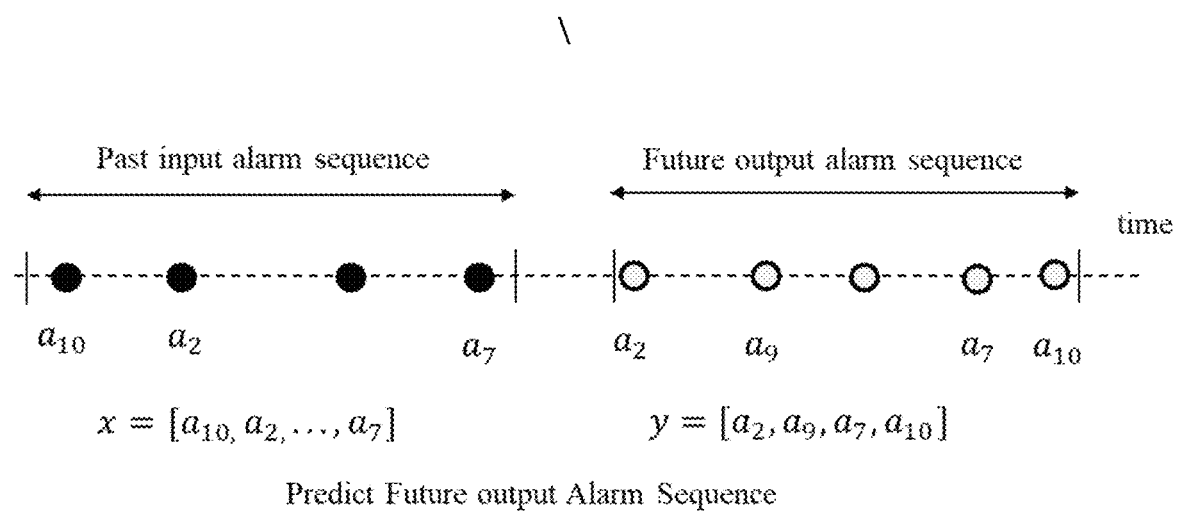
FIG. 4 depicts the long duration future output alarm sequence predicted by the system of FIG. 1 based on received past input alarm sequence, in accordance with some embodiments of the present disclosure.

At step 210 of the method 200, the one or more hardware processors 104 are configured to predict, during inferencing stage, by the trained BiLSTM a future output alarm sequence for a next plurality of hours based on an immediate input alarm sequence recorded in recent past for the facility. The predicted alarm sequence is as shown in FIG. 4, while alarm predictions of prior art that are limited to next alarm or few important alarms are depicted in FIGS. 3a and 3B respectively for comparison.

Table 4 below provides performance of the BiLSTM of the system 100 for training dataset and test dataset.

TABLE 4

| Algorithm | Data | Accuracy | Precision | Recall | F1 score |
| --- | --- | --- | --- | --- | --- |
| Bidirectional LSTM with Encoder Decoder | Train | 0.58 | 0.95 | 0.35 | 0.51 |
| | Test | 0.57 | 0.93 | 0.33 | 0.48 |

At step 212 of the method 200, the one or more hardware processors 104 are configured to recommend an operator action sequence from among the plurality of operator action sequences for the predicted future alarm output sequence. The recommended operator action sequence is associated with a unique alarm sequence from among the plurality of unique alarm sequences that has a highest Matching Sequence Score (MSS) with the predicted future output alarm sequence.

The MSS for each of the plurality of alarm sequences is computed by evaluating a ratio of i) summation of a plurality of alarm sequence lengths within the predicted future output alarm sequence that matches with at least a partial alarm sequence within a unique alarm sequence beginning from a longest matching sequence to a least matching sequence with sequence length greater than or equal to 2, and ii) a length of the unique alarm sequence.

Further, the MSS is used as an evaluation metrics for the predicted future alarm sequence against actual alarm sequence (ground truth). It is computed by evaluation a ratio of i) summation of a plurality of alarm sequence lengths within the predicted future output alarm sequence that matches with at least a partial alarm sequence within an actual alarm sequence beginning from a longest matching sequence to a least matching sequence with sequence length greater than or equal to 2, and ii) a length of the actual alarm sequence.

$$\text{Match Sequence Score} = \frac{\text{Longest match length}(LML) + 2nd\ (LML) + \ldots(\text{until match length} >= 2)}{\text{Actual Sequence Length}}$$

For example, Actual Sequence=[26, 31, 26, 11, 98, 11, 98, 11, 98, 45, 11, 98]
Predicted Sequence=[26, 31, 26, 11, 98, 45, 11]
Longest matching sequence or Longest match length (LML)=26, 31, 26, 11, 98
2nd matching sequence or 2nd (LML)=45, 11 [=2]
Actual Sequence Length=12

$$\text{Match Sequence Score} = \frac{5+2}{12} = 0.58,$$

where 0 indicates complete mismatch and 1 indicates perfect match

Known sequence evaluation metrics such as Bilingual Evaluation Understudy (BLUE) score, edit distance score that are used in language translation models cannot be applied to alarm sequence evaluation. The BLUE score and edit distance score are used in the field of language translation where the words and phrases follow a certain pattern. These scores are based on N-gram modules, which are very specific to the language translation task. The same does not help to evaluate in the field of alarm sequence prediction. One of the work in the art suggests an evaluation metrics for alarm sequence prediction, however, considers only longest sequence. As mentioned earlier, the longest sequence does not perform well in case there is a single incorrect alarm predicted between two long sequence. For example, the actual sequence is [1,2,3,4,5,6,7,8,9,10] and predicted sequence is [1,2,3,4,5,20,7,8,9,10]. The longest matching sequence length in the above example is 5 of total length of 10. But the above two sequence are matching except one alarm. The MSS evaluation metrics disclosed by the gives weightage to second longest sequence length as well and provides a better matching.

The MSS disclosed by the method enables comparison between two alarm sequences, which enables to map predicted alarm sequence to closest prior defined alarm sequence and associated well tested operator actions defined in the mapping table. Thus, ensures taking most appropriate actions for any alarm sequence predicted by the system 100.

Thus, the method and system disclosed herein in provide a mechanism for alarm sequence prediction with improved accuracy of alarm events and longer duration of alarm event sequence enabling better monitoring and control of functioning of a facility with appropriate operator action well ahead of possible occurrent of undesired events associated with predicted alarms.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for alarm sequence predictions, the method comprising:
generating, via one or more hardware processors, an alarm dataset for a facility from historical alarm data further comprising a timestamp of a triggered alarm, an alarm identity (ID), an alarm description and related equipment in the facility, wherein the facility is monitored via a plurality of sensors to capture the historical alarm data, each datapoint in the alarm dataset comprising a past input alarm sequence and a future output alarm sequence comprising single or multiple occurrences of unique alarms each identified with the alarm ID;
preprocessing, via the one or more hardware processors, the alarm dataset to generate a training dataset, wherein the preprocessing further comprising chattering removal, unimportant alarms removal, resizing the past input alarm sequence to an optimal input sequence length and the future output alarm sequence to an optimal output sequence length;

training, via the one or more hardware processors, a Bidirectional Long short-term memory (BiLSTM) on a training dataset for predicting an alarm sequence for the facility for a time duration of a plurality of hours, wherein a total number of the unique alarms in the historical alarm data represents a plurality of features for the BiLSTM, the optimal input sequence length is an input to the Bi-LSTM to generate the optimal output sequence length of the future output alarm sequence to be predicted post training by the BiLSTM;

generating, via the one or more hardware processors, a mapping table using the preprocessed historical alarm data of the facility to map a plurality of unique alarm sequences with associated plurality of operator action sequences;

predicting, during inferencing stage, by the trained BiLSTM executed by the one or more hardware processor, a future output alarm sequence for a next plurality of hours based on an immediate input alarm sequence recorded in recent past for the facility; and recommending, via the one or more hardware processors, an operator action sequence from among the plurality of operator action sequences for the predicted future alarm output sequence, wherein the recommended operator action sequence is associated with a unique alarm sequence from among the plurality of unique alarm sequences that has a highest Matching Sequence Score (MSS) with the predicted future output alarm sequence.

2. The processor implemented method of claim 1, wherein the MSS for each of the plurality of alarm sequences is computed by evaluating a ratio of i) summation of a plurality of alarm sequence lengths within the predicted future output alarm sequence that matches with at least a partial alarm sequence within a unique alarm sequence beginning from a longest matching sequence to a least matching sequence with sequence length greater than or equal to 2, and ii) a length of the unique alarm sequence.

3. The processor implemented method of claim 2, wherein the MSS is used as an evaluation metrics for the predicted future alarm sequence and is computed by evaluation a ratio of i) summation of a plurality of alarm sequence lengths within the predicted future output alarm sequence that matches with at least a partial alarm sequence within an actual alarm sequence beginning from a longest matching sequence to a least matching sequence with sequence length greater than or equal to 2, and ii) a length of the actual alarm sequence.

4. The processor implemented method of claim 1, wherein the BiLSTM comprises an encoder and a decoder with a number of LSTM units equal to 128, a number of epochs (epochs) equal to 30, a batch size equal to 128, a Dropout layer equal to 0.3 obtained experimentally, wherein the BiLSTM uses for a Relu activation function, a Weighed focal loss function and a rmsprop optimizer.

5. A system for alarm sequence predictions, the system comprising:

a memory storing instructions;

one or more Input/Output (I/O) interfaces; and one or more hardware processors coupled to the memory via the one or more I/O interfaces, wherein the one or more hardware processors are configured by the instructions to:

generate an alarm dataset for a facility from historical alarm data further comprising a timestamp of a triggered alarm, an alarm identity (ID), an alarm description and related equipment in the facility, wherein the facility is monitored via a plurality of sensors to capture the historical alarm data, each datapoint in the alarm dataset comprising a past input alarm sequence and a future output alarm sequence comprising single or multiple occurrences of unique alarms each identified with the alarm ID;

preprocess the alarm dataset to generate a training dataset, wherein the preprocessing further comprising chattering removal, unimportant alarms removal, resizing the past input alarm sequence to an optimal input sequence length and the future output alarm sequence to an optimal output sequence length;

train a Bidirectional Long short-term memory (BiLSTM) on a training dataset for predicting an alarm sequence for the facility for a time duration of a plurality of hours, wherein a total number of the unique alarms in the historical alarm data represents a plurality of features for the BiLSTM, the optimal input sequence length is an input to the Bi-LSTM to generate the optimal output sequence length of the future output alarm sequence to be predicted post training by the BiLSTM;

generate a mapping table using the preprocessed historical alarm data of the facility to map a plurality of unique alarm sequences with associated plurality of operator action sequences;

predict by the trained BiLSTM executed by the one or more hardware processor, a future output alarm sequence for a next plurality of hours based on an immediate input alarm sequence recorded in recent past for the facility; and recommend an operator action sequence from among the plurality of operator action sequences for the predicted future alarm output sequence, wherein the recommended operator action sequence is associated with a unique alarm sequence from among the plurality of unique alarm sequences that has a highest Matching Sequence Score (MSS) with the predicted future output alarm sequence.

6. The system of claim 5, wherein the MSS for each of the plurality of alarm sequences is computed by evaluating a ratio of i) summation of a plurality of alarm sequence lengths within the predicted future output alarm sequence that matches with at least a partial alarm sequence within a unique alarm sequence beginning from a longest matching sequence to a least matching sequence with sequence length greater than or equal to 2, and ii) a length of the unique alarm sequence.

7. The system of claim 6, wherein the MSS is used as an evaluation metrics for the predicted future alarm sequence and is computed by evaluation a ratio of i) summation of a plurality of alarm sequence lengths within the predicted future output alarm sequence that matches with at least a partial alarm sequence within an actual alarm sequence beginning from a longest matching sequence to a least matching sequence with sequence length greater than or equal to 2, and ii) a length of the actual alarm sequence.

8. The system of claim 5, wherein the BiLSTM comprises an encoder and a decoder with a number of LSTM units equal to 128, a number of epochs (epochs) equal to 30, a batch size equal to 128, a Dropout layer equal to 0.3 obtained experimentally, wherein the BiLSTM uses for a Relu activation function, a Weighed focal loss function and a rmsprop optimizer.

9. One or more non-transitory machine-readable information storage mediums comprising one or more instructions which when executed by one or more hardware processors cause:

generating, an alarm dataset for a facility from historical alarm data further comprising a timestamp of a triggered alarm, an alarm identity (ID), an alarm description and related equipment in the facility, wherein the facility is monitored via a plurality of sensors to capture the historical alarm data, each datapoint in the alarm dataset comprising a past input alarm sequence and a future output alarm sequence comprising single or multiple occurrences of unique alarms each identified with the alarm ID;

preprocessing the alarm dataset to generate a training dataset, wherein the preprocessing further comprising chattering removal, unimportant alarms removal, resizing the past input alarm sequence to an optimal input sequence length and the future output alarm sequence to an optimal output sequence length;

training a Bidirectional Long short-term memory (BiLSTM) on a training dataset for predicting an alarm sequence for the facility for a time duration of a plurality of hours, wherein a total number of the unique alarms in the historical alarm data represents a plurality of features for the BiLSTM, the optimal input sequence length is an input to the Bi-LSTM to generate the optimal output sequence length of the future output alarm sequence to be predicted post training by the BiLSTM;

generating a mapping table using the preprocessed historical alarm data of the facility to map a plurality of unique alarm sequences with associated plurality of operator action sequences;

predicting, during inferencing stage, by the trained BiLSTM executed by the one or more hardware processor, a future output alarm sequence for a next plurality of hours based on an immediate input alarm sequence recorded in recent past for the facility; and recommending an operator action sequence from among the plurality of operator action sequences for the predicted future alarm output sequence, wherein the recommended operator action sequence is associated with a unique alarm sequence from among the plurality of unique alarm sequences that has a highest Matching Sequence Score (MSS) with the predicted future output alarm sequence.

10. The one or more non-transitory machine-readable information storage mediums of claim 9, wherein the MSS for each of the plurality of alarm sequences is computed by evaluating a ratio of i) summation of a plurality of alarm sequence lengths within the predicted future output alarm sequence that matches with at least a partial alarm sequence within a unique alarm sequence beginning from a longest matching sequence to a least matching sequence with sequence length greater than or equal to 2, and ii) a length of the unique alarm sequence.

11. The one or more non-transitory machine-readable information storage mediums of claim 10, wherein the MSS is used as an evaluation metrics for the predicted future alarm sequence and is computed by evaluation a ratio of i) summation of a plurality of alarm sequence lengths within the predicted future output alarm sequence that matches with at least a partial alarm sequence within an actual alarm sequence beginning from a longest matching sequence to a least matching sequence with sequence length greater than or equal to 2, and ii) a length of the actual alarm sequence.

12. The one or more non-transitory machine-readable information storage mediums of claim 9, wherein the BiLSTM comprises an encoder and a decoder with a number of LSTM units equal to 128, a number of epochs (epochs) equal to 30, a batch size equal to 128, a Dropout layer equal to 0.3 obtained experimentally, wherein the BiLSTM uses for a Relu activation function, a Weighed focal loss function and a rmsprop optimizer.

* * * * *